United States Patent [19]

Michael et al.

[11] 4,240,109
[45] Dec. 16, 1980

[54] VIDEO MOVEMENT DETECTION

[75] Inventors: Peter C. Michael, Newbury; Richard J. Taylor, London; Martin R. Trump, Newbury, all of England

[73] Assignee: Micro Consultants, Limited, Berkshire, England

[21] Appl. No.: 15,700

[22] Filed: Feb. 27, 1979

Related U.S. Application Data

[63] Continuation-in-part of Ser. No. 841,519, Oct. 12, 1977, Pat. No. 4,163,249.

[30] Foreign Application Priority Data

Oct. 14, 1976 [GB] United Kingdom ............... 42751/76
Jul. 26, 1977 [GB] United Kingdom ............... 31355/77
Jul. 26, 1977 [GB] United Kingdom ............... 31356/77
Jul. 26, 1977 [GB] United Kingdom ............... 31357/77
Sep. 14, 1978 [GB] United Kingdom ............... 36838/78

[51] Int. Cl.³ ............................................. H04N 7/18
[52] U.S. Cl. .................................................. 358/105
[58] Field of Search .......................................... 358/105

[56] References Cited

U.S. PATENT DOCUMENTS 3,988,533  10/1976  Mick et al. ........................... 358/105

Primary Examiner—Richard Murray
Attorney, Agent, or Firm—Dowell & Dowell

[57] ABSTRACT

A movement detection method and system capable of detecting picture point movement in portions of a picture in the presence of noise. Each picture point within the frame in turn is examined with a corresponding picture point from the previous frame to detect when movement has occurred for that particular picture point. To distinguish between noise and movement, a number of selected picture points adjacent the picture point are also examined to see if movement is occurring. By examining a number of picture joints noise tends to be attenuated while movement is not, so that true movement can be detected.

23 Claims, 14 Drawing Figures

VIDEO MOVEMENT DETECTION

This is a continuation-in-part application to Ser. No. 841,519 filed Oct. 12, 1977, now U.S. Pat. No. 4,163,249.

BACKGROUND OF THE INVENTION

The invention relates to movement detection in video picture content. Such movement detection is useful in systems where picture information (either T.V. picture points, lines or frames) is stored and used with more recent picture information. Such systems include noise reduction and standards conversion.

SUMMARY OF THE INVENTION

According to the invention there is provided a movement detector for video data comprising: input means for measuring the difference between incoming data from at least one picture point on one field with data from at least one picture point from a previous field, and output means for providing a control signal in dependence on the measured difference from said input means.

Further according to the invention there is provided a method of detecting movement in video data comprising measuring the difference between data from at least one picture point and data from at least one earlier picture point to provide an indication that movement has occurred.

BRIEF DESCRIPTION OF DRAWINGS

The invention will now be described by way of example with reference to the accompanying drawings in which.

DESCRIPTION OF PREFERRED EMBODIMENTS

In a noise reduction system for example where a portion of the picture information is added to incoming picture information to effectively reduce the noise content in the picture, when movement has occurred it is necessary to reduce the amount of information fed back when the moving part of the picture is being processed otherwise smearing and other effects are visible when observing the video output on a T.V. screen.

Figure 1:
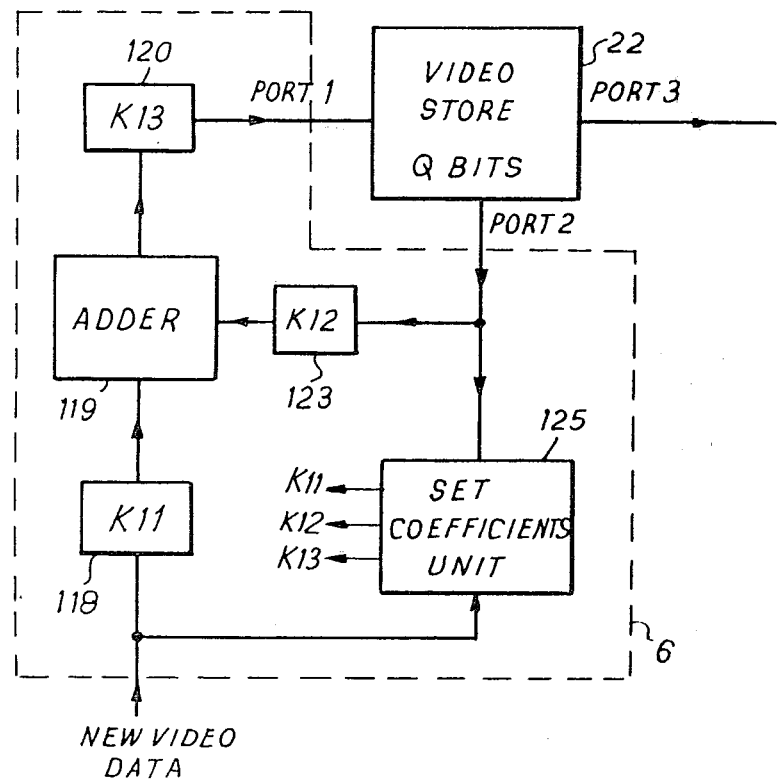
FIG. 1 shows an example of a noise reduction system.

The basic mechanism for noise reduction is the digital integration of video data within a frame store. An example of a noise reduction system is shown in FIG. 1 as disclosed in more detail in patent application No. 42751/76.

The signal paths are digital signal paths. Each of the signal paths carrying video data will be capable of carrying at least 8 bit wide video data operating at a clock rate typically 15 MHz.

New video data is applied to coefficient modifier 118 for K11. Modifier 118 takes a proportion of the incoming video information and applies it to a digital adder 119. A second input to the digital adder is provided by previously stored video information after modification by coefficient modifier 123 for K12.

The output from the digital adder is applied to coefficient modifier 120 for K13 for application to the video store 22 at port 1.

Port 1 is an input port to the digital frame store capable of carrying a full frame of television information where each storage location is wider than 8 bits. In a practical system a total of 12 bits may be used at each location in the video store. Such a video store would in practice have a capacity of approximately 6 megabits. The video store has a minimum of a single input port and a single output port. More typically the video store will have three ports, one of which is an input port whilst the second two are output ports. The arrangement of the store will enable the input and output to run non-synchronously with respect to television field and line rates. Port 2 will be capable of running synchronously with port 1 so that video data stored at the same picture location from a previous field may be accessed at the same time as new information for the same picture point is available in the next desired field.

Thus access to the top left hand picture element of field 1 is available from port 2 at the same time that the top left hand element of field 3 is available on the new video data input.

A video store is described in detail in British application 6585/76 for example.

The value of the coefficients is provided by set coefficients unit 125. In a simple system the values of the coefficients would be fixed so that the portions of the previous data and incoming data would have a predetermined relationship.

However, a conflict exists between the requirements for noise reduction in which the maximum integration time should be used and the requirement that the picture shall maintain movement portrayal without distortion. The latter—movement portrayal requires the minimum integration time. Thus it is desirable to provide an adaptive mechanism which is sufficiently intelligent to adjust the coefficients for variable integration time depending upon picture content.

If the incoming video information is stationary—for example a test card transmission —coefficients k11, k12 and k13 may be set to a value for optimum noise reduction. Typical examples of the coefficients under these conditions are:

k11=0.125
k12=0.875
k13=1.0

If the total picture is moving, for example during the "pan" of a camera then the coefficients k11, k12 and k13 may require setting at values shown below if movement portrayal is not to be distorted by the effect of the noise reduction system. Typical coefficients under camera pan operations are:

k11=0.875
k12=0.125
k13=1.0

During the above two examples it would be possible to take an overall picture level movement measurement and apply that to fix the coefficients k11, k12 and k13 for the total frame period. If part of the picture is stationary whilst part remains moving in order to obtain effective noise reduction over the stationary part of the picture whilst allowing movement portrayal without distortion, it becomes necessary to modify k11, k12 and k13 on a picture point by picture point basis.

The first step towards a more effective coefficient modification system which adapts to picture movement is the comparison of changes which have occurred between successive data values stored at the same picture location in sequential pictures, and such a mechanism for determining that changes are occurring in the picture is a movement detector. The movement detector could conveniently be provided within set coefficients unit 125 so that it receives new and previously stored data.

Figure 2:
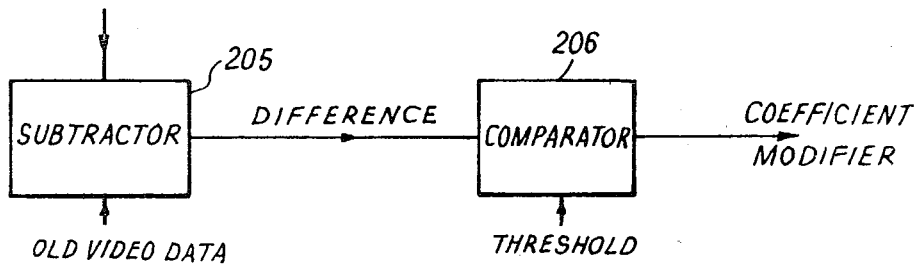
FIG. 2 shows a simple movement detector arrangement.

A simple movement detector is shown in FIG. 2 and comprises a subtractor 205 which receives the old and new data and its output is passed to comparator 206.

Each picture point in a new picture is subtracted from the data previously stored at the same location and the difference signal is applied to the comparator. As explained above, the movement detector could be incorporated within set coefficients unit 125 which receives new and previously stored picture data. If the difference signal exceeds a threshold level the picture is deemed to have moved and coefficients k11, k12 and k13 are switched to levels which would be appropriate for movement. Whilst the change remains within the threshold level coefficients suitable for noise reduction of still images are utilised.

However a system as above for the movement detector using a subtractor and comparator is adequate for detection of movement in some systems (e.g. picture compression) in noise reduction systems it has been found that adjustment to threshold levels and coefficient settings are required if the system is to operate satisfactorily.

Figure 3:
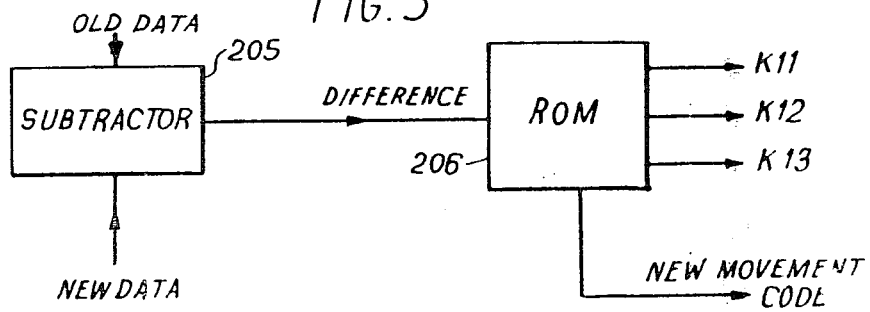
FIG. 3 shows a movement detector arrangement with a ROM for providing selected coefficient levels and for providing a movement code.

To overcome this problem an alternative arrangement for the movement detector which may be incorporated in set coefficient unit 125 is shown in FIG. 3.

A read only memory (ROM) 206 is provided in place of the comparator and the subtractor 205 is used in a similar manner to the earlier arrangement. The mode of operation of a ROM and construction thereof is well known. The difference signal is now used to address read only memory which contains various coefficients of k11, k12 and k13 in fixed storage locations. Large movements are differentiated from small movements and a sliding scale of coefficients k11, k12 and k13 is provided on a real time basis. A movement code can be generated to be used by other parts of the video system if required and as used for example in the adaptive volume processor described in British patent application 31355/77. The movement code can be stored with the normal video data in store 22. The way in which this movement code is generated will be described below.

Figure 4:
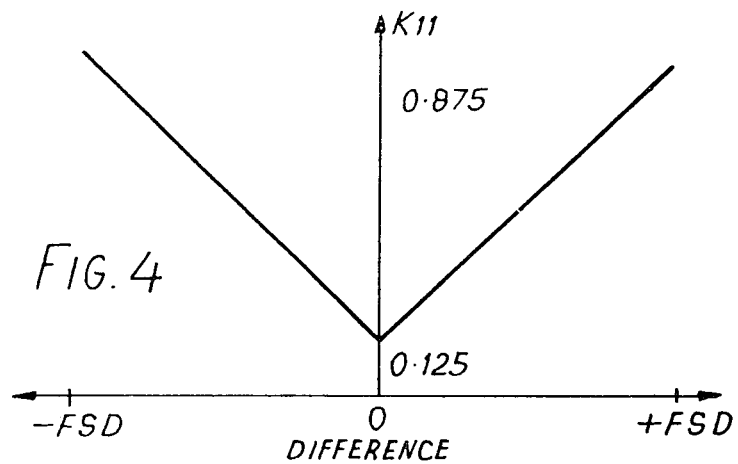
FIG. 4 shows a graph of variations in coefficient K11 dependent on the amount of difference measured by the subtractor of FIG. 3.

FIG. 4 shows a typical example of the co-efficient k11 as stored in ROM. The graph is shown against two axis. The difference signal is the horizontal axis whilst k11 is the vertical axis. If there is zero difference between old data and new data k11 is set to 0.125. If there is a full scale difference of either polarity between old data and new data k11 is set to 0.875.

Any value of the difference measured lying between zero and full scale will give a corresponding value of k11 from the graph.

Figure 5:
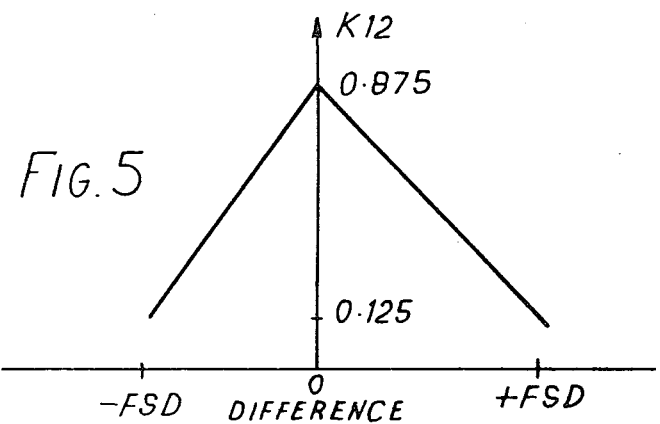
FIG. 5 shows typical variations in coefficient K12.

The same difference signal produced by subtractor 205 is used within the ROM to calculate the value of K12 as shown in FIG. 5. If there is zero difference between old data and new data k12 is set at 0.875. If there is a difference signal between old data and new data approaching full scale k12 is set to 0.125. Between the two extremes a sliding scale for values of k11 and k12 is chosen. The settings for k13 could be similarly effected.

Figure 6:
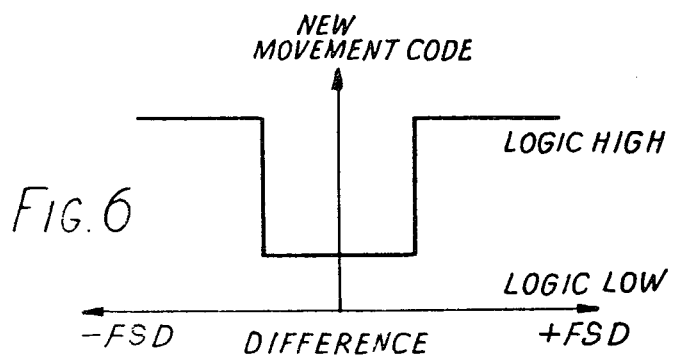
FIG. 6 shows an example of the movement code generated at the ROM output in dependence on the measured difference.

As mentioned concerning the ROM 206 of FIG. 3 the system provides movement information for use in for example the adaptive volume processor. This is provided by a single data bit available as a function of the difference signal and stored in the read only memory. FIG. 6 shows the movement code to be applied to the volume processor. The transfer function is similar to the simple comparator and threshold mechanism. Provided that the difference does not exceed a given threshold value the movement code remains at a logical low. If the difference signal exceeds the threshold value the movement code becomes logical high. No intermediate values are permitted between logical low and logical high. In practice it has been found that the threshold for movement coding may be set to a fixed level to cover all input signal variations.

The movement code bit derived from the mechanism just described is stored together with the video data in the store 22 as before. One of the bits in each location is allocated to storing the movement code to be later used by the adaptive volume processor.

Figure 7:
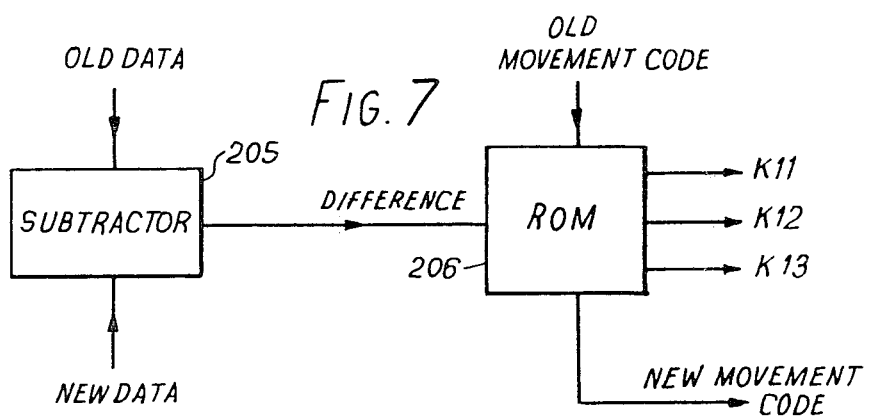
FIG. 7 shows the movement detector incorporating an alternative coefficient setting system using the movement code from previous data.

In addition to the use of the movement code in the volume processor the stored movement code may be utilised to provide more intelligent adaptive control of the noise reduction system. At the same time that the video data is retrieved from port 2 the old movement code is extracted and applied to the ROM. Two different coefficient curves for k11 are stored in the ROM and are accessed in dependence upon the value of the old movement code. This ensures that the scene has been stationary for two frame periods before applying the heavier noise reduction coefficients. Such an arrangement is shown in FIG. 7. ROM 206 receives the difference signal and the old movement code and produces the settings for k11, k12 and k13 together with the new movement code.

Figure 8:
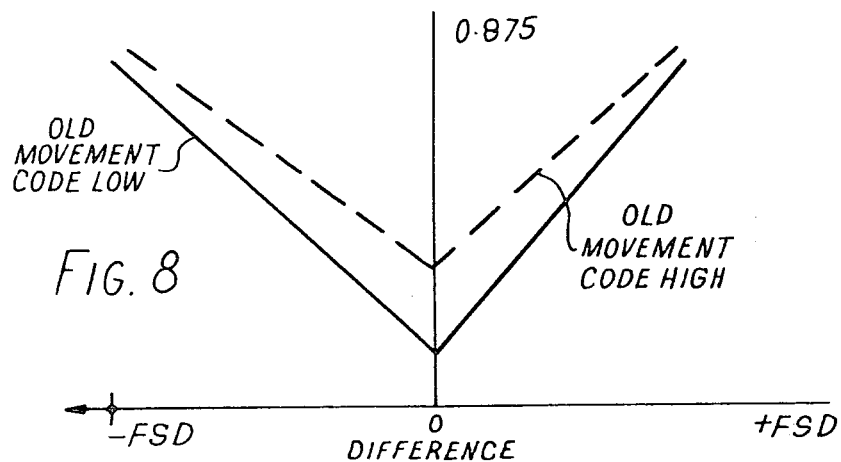
FIG. 8 shows a graph of coefficient K11 stored in the ROM and modified by the previously stored movement code.

FIG. 8 shows the two different curves for k11. The upper curve shows when old movement curve is high and the lower curve when the old movement curve is low. In a similar way curves are stored for two different coefficients of k12 and k13.

The description so far is for an adaptive system which can change on a point to point basis and is generally controlled by a point to point comparison. As discussed earlier, a number of effects may give rise to a change in coefficient and not all the effects are due to movement. For example, impulsive noise or tape recorder noise may also give rise to a different signal which is interpreted as movement. The descriptions which follow offer several mechanisms which distinguish between true movement and noise.

Figure 9:
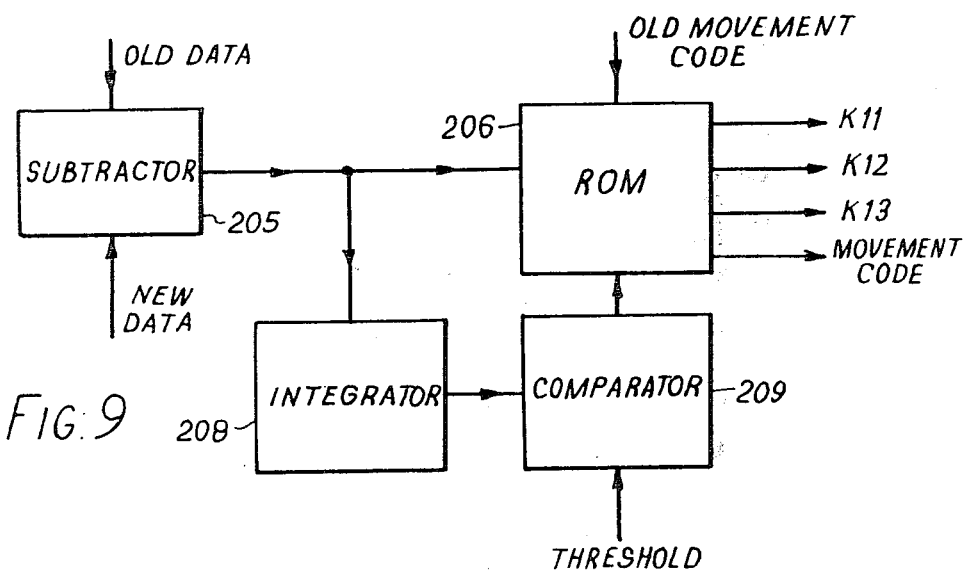
FIG. 9 shows an arrangement using overall difference integration for detecting picture movement in the presence of noise.
Figure 10:
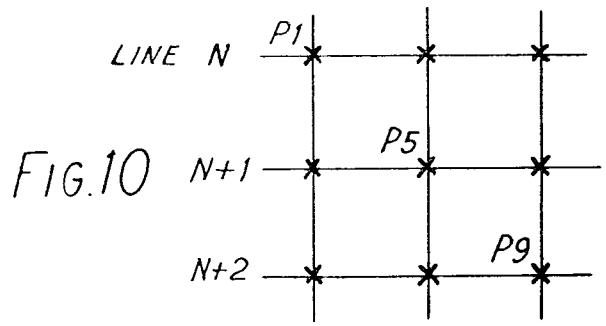
FIG. 10 shows the area voting system for movement detection in the presence of noise or residual subcarrier.

FIG. 9 shows a system which incorporates a digital integrator. The subtractor 205 accepts old and new data as before and the difference is passed to ROM 206. The old movement code is received by the ROM. An integrator 208 also receives the difference signal from substractor 205 and the integrator output is received by a comparator 209 which compares this signal with a threshold level and the comparator output is connected to an input of the ROM. The integrator accepts the difference signal and produces an average value over a given period of time longer than a picture point interval. Provided that the noise is of a statistical nature, the digital integrator will generally sit with a value close to zero. Movement on the other hand will cause the intregrator level to rise. The comparator and threshold system is applied to the output of the integrator and used to produce another signal which may be applied to the ROM. The ROM will have in addition to the two stored curves for k11 which are selected by the movement code described above, two further curves for K11 which are selected in dependence on the comparator output. The integration time may be selected as a part of a line, a full line, several lines or a complete field. In practice, a selection of several lines have been found to be a suitable value to differentiate effectively between true movement and noise. The subtraction between old video data and new video data has been described on a single picture point basis. It has been found however that a more effective method of determining the difference between noise and true movement may be made if an area of picture is examined. FIG. 10 shows the area examination system. In the example given 9 picture points are arranged in the form of a square with a single picture point in the centre. To determine the total difference at picture points P5 a contribution from all surrounding picture points is made. This is effected by independently assessing each picture point in the area for threshold and using a majority logic gate for detecting the threshold decision so that if a proportion are found to exceed the threshold movement is signalled to have taken place. The system has a particular advantage in a colour television system utilising NTSC or PAL colour subcarrier. Utilising the arrangement shown for area movement detection the system may be made insensitive to residual subcarrier. The design of a decoding circuit to eliminate residual subcarrier is simplified if a scheme is utilised which is generally insensitive to the presence of residual subcarrier components.

It is to be appreciated that the present invention is concerned with the movement detector and the way in which it controls the coefficient selection. The scheme of FIG. 1 using three coefficient systems is only an example of a noise reduction system and the movement detector could be used in other systems.

Figure 11:
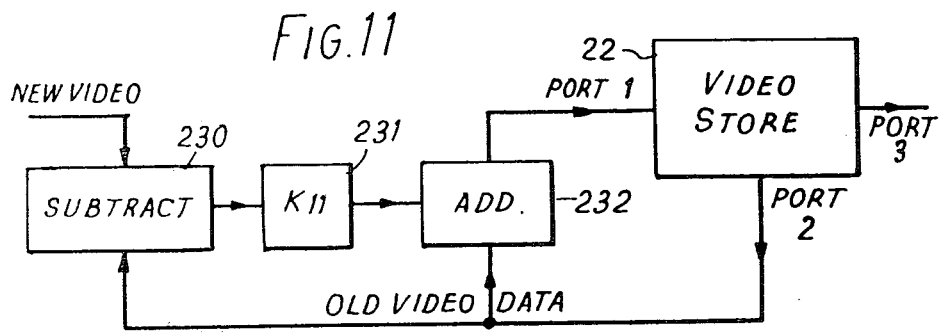
FIG. 11 shows an alternative noise reduction system.

FIG. 11 shows an alternative method for implementing a noise reduction system which reduces the multiplier functions to a single unit. The implementation makes use of the general requirement that coefficient k11 is equal to 1 minus coefficient k12 for general purpose noise reduction, ie.

k11 = 1-k12

In this arrangement subtractor 230 receives the new video at one input and the previous video at a second input. The output is modified by coefficient k11 in modifier 231. This output is passed to one input of adder 232 which adds this to the previous data from store 22. In such a scheme the ROM 206 will be implemented to provide only one coefficient.

Figure 12:
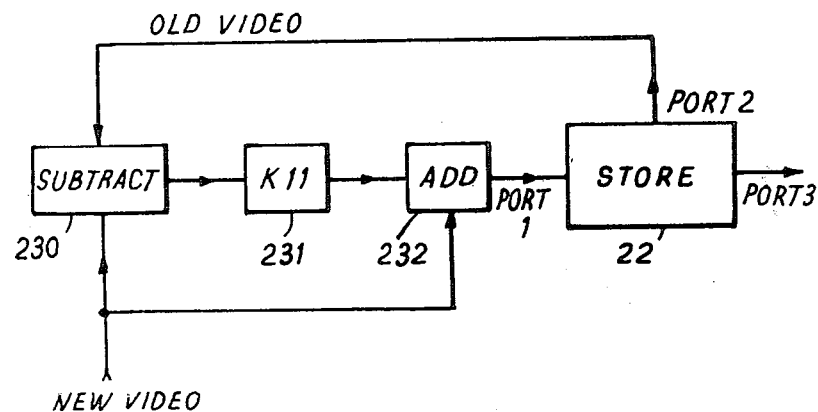
FIG. 12 shows another alternative noise reduction system.

An alternative noise reduction scheme also using one multiplier (k11) is shown in FIG. 12.

So far the description has mainly related to the use of movement detectors for controlling the coefficients of noise reduction systems.

Movement detectors can be used in other video systems for example in picture compressors and expanders and in standards conversion.

Figure 13:
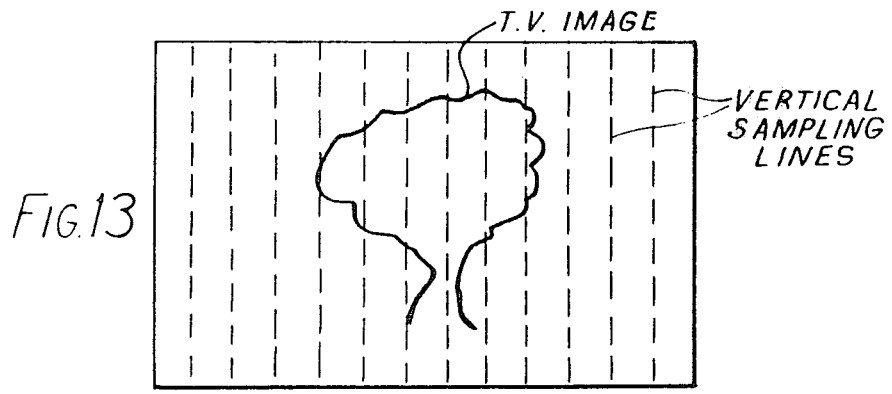
FIG. 13 shows a full screen image with vertical sampling lines for detecting camera panning.

An alternative movement detection method is shown in FIG. 13 and is useful to detecting horizontal and diagonal camera panning.

A series of sampling points are arranged across the complete television raster. In the diagram shown vertical lines are chosen. The vertical lines are fixed against the television raster and in effect the picture moves behind the vertical lines. Whenever a camera pan takes place all of the vertical sampling points see movement occurring. The detection of movement at all of the vertical sampling points simultaneously indicates that a camera pan is occurring. On detection of panning, the different coefficients can be automatically selected to produce the best subjective effect whenever a large number of the vertical lines sees this movement. This can be useful for noise reduction systems and more particularly for standards converters.

In an alternative movement detection system now to be described a combination of single picture point and area comparison will be used to advantage.

Figure 14:
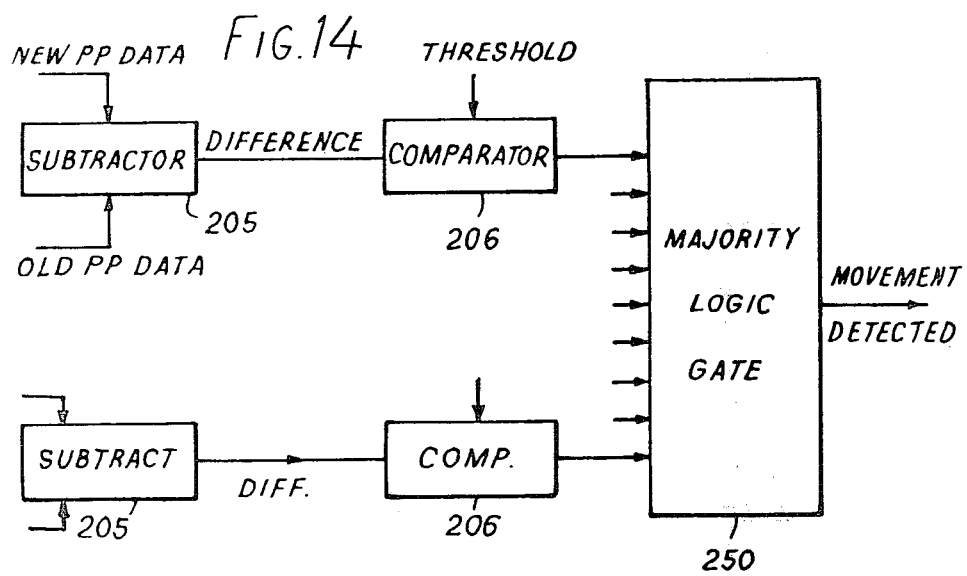
FIG. 14 shows a majority voting arrangement for determining movement in the area of FIG. 10.

FIG. 10 illustrates an area voting system for movement detection in the presence of noise or residual subcarrier. In this system, each picture point is independently assessed for threshold and a majority logic gate applied to the decision, so that if a proportion of the points are found to have exceeded threshold, movement is signalled to have taken place. In this system, four out of nine is a practical setting to indicate movement. An example of such a system is illustrated in FIG. 14. The difference is provided by the subtractor 205 as before and passes to comparator 206. The output passes to the majority logic gate 250. Only two of the nine inputs to the gate are shown in detail.

A further method of utilizing the area voting system does not make use of majority logic. In this method, the total area is integrated, so that the average difference over the area is compared with a threshold. The object is to differentiate between noise and movement. The larger the number of picture points integrated, the closer the noise is averaged towards zero, whereas movement remains unattenuated.

On the other hand, there is a disadvantage of using too large an area to the emergence of a noise "halo" around moving subjects. The noise "halo" approximates to the size of the area linear dimensions in both the horizontal and vertical axis. It is over that dimension that it becomes impossible to detect the difference between noise and movement utilizing the area voting system.

In an effort to increase the detection's system ability to differentiate between noise and movement without increasing the area over which the decision is made, a combination of two fields from the same frame have been used to supply the selected picture points as an alternative to using a single field from two frames described above have now been utilized. In this way, it becomes possible to double the number of points within the area (volume) close to the picture point and thus attenuate the noise without attenuating the movement.

In practice the combination of point by point detection for large amplitude movement, together with area voting movement detection, provides the best results. The area system is capable of detecting very small changes of tonal quality over an area, such as occurs when skin tones on a face move. The point by point threshold detection system is able to detect an instantanous single picture point movement of large amplitude such as occurs when a sharp edge transition is present in motion.

An alternative constructional embodiment of the store and processor is disclosed in U.S. application Ser. No. 841,519 in relation to FIGS. 31 and 36 thereof.

We claim:

1. A movement detector for detecting picture point movement in video data in the presence of noise comprising: input means for measuring the difference between incoming data from a selected number of picture points on one field with data from a selected number of corresponding picture points from a previous field adjacent the picture point for which movement is to be determined, and output means for providing a control signal in dependence on the measured difference between the selected picture points from said input means.

2. A movement detector according to claim 1, wherein the input means comprises a subtractor and said output means comprises a comparator which compares the difference from said input means with a threshold level to provide a control signal which varies in dependence on whether the threshold level has been exceeded by the selected picture points.

3. A movement detector according to claim 1, wherein the input means comprises a subtractor and said output means comprises a memory which is addressed in dependence on the difference between the selected picture points measured by the input means to provide a control signal which varies in dependence on this measured difference.

4. A movement detector according to claim 3, wherein the memory comprises a read only memory having a plurality of values for the control signal stored in locations therein and a particular location being assessed in dependence on the difference indicative of movement detected.

5. A movement detector according to claim 4, wherein the values stored in the memory correspond to coefficient values for a noise reduction system multiplier and said control signal is the value of the coefficient selected for use by said multiplier.

6. A movement detector according to claim 3, wherein a integrator is provided to average the difference measured over a period exceeding one picture point interval.

7. A movement detector according to claim 6 wherein a comparator is provided to compare the integrated output with a threshold level to determine picture movement.

8. A movement detector according to claim 3, wherein the control signal produced by the memory is linearily proportional to the measured difference.

9. A movement detector according to claim 3, wherein the output means generates a code signal indicative of movement in addition to the control signal.

10. A movement detector according to claim 9 wherein the memory includes two sets of control signal levels which are selectable in dependence on the code signal previously generated.

11. A movement detector according to claim 1, wherein averaging means are provided for averaging a portion of picture comprising the selected number of picture points.

12. A movement detector according to claim 11, wherein the averaging means are adapted to detect movement in a predetermined number of the selected picture points to determine that movement has occured.

13. A movement detector according to claim 11, wherein the averaging means averages a portion of picture comprising small area of the picture.

14. A movement detector according to claim 11, wherein the averaging means averages a portion of the picture comprising a vertical line of picture points for detecting camera panning.

15. A movement detector according to claim 11, wherein the averaging means averages a portion of picture from two fields in the same frame with a corresponding portion from two fields in a previous frame.

16. A movement detector according to claim 11, wherein point by point detection is provided in combination with detection within the selected picture portion.

17. A method of detecting picture point movement in video data in the presence of noise comprising measuring the difference between data from a selected number of picture points on one field and data from a selected number of corresponding picture points from a previous field adjacent the picture point for which movement is to be determined to provide an indication that movement has occured.

18. A method according to claim 17, wherein a portion of picture comprising several picture points from two fields of the same frame is compared with a corresponding portion from two fields from an earlier frame.

19. A method according to claim 17 wherein the selected number of picture points comprise a number of picture points along one line.

20. A method according to claim 17 wherein the selected number of picture points comprise a small area of picture.

21. A method according to claim 20, wherein a small area is taken from two picture fields of the same frame to provide the selected number of picture points.

22. A method according to claim 17 wherein movement is deemed to have taken place if a predetermined number of the picture points have a difference therebetween.

23. A method according to claim 17, wherein a combination of single picture point detection and movement detection using a selected number of picture points is used to determine that movement has occured.

* * * * *